(12) United States Patent
Brück et al.

(10) Patent No.: US 6,840,984 B2
(45) Date of Patent: Jan. 11, 2005

(54) DEVICE FOR ADSORBING AT LEAST ONE COMPONENT OF AN EXHAUST GAS

(75) Inventors: Rolf Brück, Bergisch Gladbach (DE); Peter Hirth, Lohmar (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 93 days.

(21) Appl. No.: 10/302,209

(22) Filed: Nov. 22, 2002

(65) Prior Publication Data

US 2003/0068254 A1 Apr. 10, 2003

Related U.S. Application Data

(63) Continuation of application No. PCT/EP01/05998, filed on May 25, 2001.

(30) Foreign Application Priority Data

Jun. 2, 2000 (DE) .......................................... 100 27 401

(51) Int. Cl.[7] ............................ F01N 3/00; B01D 53/04
(52) U.S. Cl. ............................... 96/108; 96/154; 60/311
(58) Field of Search ...................... 96/108, 154; 95/90, 95/902; 422/180; 60/311; 123/434; 502/60

(56) References Cited

U.S. PATENT DOCUMENTS

| | | | |
|---|---|---|---|
| 3,891,575 A | | 6/1975 | Bräutigam et al. |
| 5,078,979 A | * | 1/1992 | Dunne .......................... 423/212 |
| 5,260,035 A | * | 11/1993 | Lachman et al. ............. 422/180 |
| 5,269,140 A | * | 12/1993 | Take et al. ..................... 60/274 |
| 5,768,888 A | * | 6/1998 | Matros et al. ................. 60/274 |
| 6,042,797 A | * | 3/2000 | Ogawa et al. ................ 423/213.2 |
| 6,074,973 A | * | 6/2000 | Lampert et al. .............. 502/60 |
| 6,171,557 B1 | * | 1/2001 | Takahashi et al. ............ 422/177 |

FOREIGN PATENT DOCUMENTS

| | | |
|---|---|---|
| DE | 198 14 132 A1 | 10/1999 |
| EP | 0 593 898 A1 | 4/1994 |
| EP | 0593898 A1 * | 4/1994 |
| EP | 0886040 A2 * | 12/1998 |

OTHER PUBLICATIONS

Bauer, H.: "Kraftfahrtechnischen Taschenbuch" [Automotive Handbook], VDI–Verlag, Düsseldorf, Germany, vol. 22, 1995.

* cited by examiner

Primary Examiner—Frank M. Lawrence
(74) Attorney, Agent, or Firm—Laurence A. Greenberg; Werner H. Stemer; Gregory L. Mayback

(57) ABSTRACT

A device for adsorbing at least one component of an exhaust gas, in particular in an exhaust system of an internal-combustion engine of a vehicle, includes an adsorber having a volume through which an exhaust gas can flow at a temperature and a mass flow rate. The volume corresponds to the following equation:

$$V \leq a + b \cdot t + \frac{c}{m} + d \cdot t^2 + \frac{e}{m^2} + \frac{f \cdot t}{m} + g \cdot t^3 + \frac{h}{m^3} + \frac{i \cdot t}{m^2} + \frac{k \cdot t^2}{m},$$

where V=volume of the adsorber [1], t=mean temperature of the exhaust gas [° C.], and m=mean mass flow rate of the exhaust gas [kg/h]. An adsorber with such a volume has a particularly compact structure, as a function of properties of the exhaust gas flowing through it and thus, for example, improves a cold-start performance of a downstream catalytic converter.

5 Claims, 1 Drawing Sheet

DEVICE FOR ADSORBING AT LEAST ONE COMPONENT OF AN EXHAUST GAS

CROSS-REFERENCE TO RELATED APPLICATION

This application is a continuation of copending International Application No. PCT/EP01/05998, filed May 25, 2001, which designated the United States and was not published in English.

BACKGROUND OF THE INVENTION

Field of the Invention

The invention relates to a device for adsorbing at least one component of an exhaust gas, having an adsorber through which an exhaust gas can flow. Such adsorbers are used, in particular, in an exhaust system of an internal-combustion engine of a vehicle.

Various concepts for limiting emissions are currently being pursued in order to satisfy increasingly stringent exhaust restrictions throughout the world. The emissions behavior of an exhaust system after a cold start of an internal-combustion engine is at the forefront of those developments. The emissions behavior after a cold start is assessed on the basis of various driving cycles such as, for example, on the basis of the US-FTP 75 test cycle. A driving curve of the FTP 75 test cycle is composed of three speed profiles which have been measured on the streets of Los Angeles, Calif. during the morning rush hour. The FTP 75 test cycle is described, for example, in a book entitled "Kraftfahrtechnischen Taschenbuch" [Automotive Handbook], of Robert Bosch GmbH ($22^{nd}$ edition, Düsseldorf, Germany: VDI-Verlag, 1995).

Catalytic converters are used to clean the exhaust gas. The catalytic converters have a catalytically active surface which, above a defined temperature (approximately 250° C.), chemically converts the pollutants in the exhaust gas (carbon monoxide, hydrocarbons, nitrogen oxides). A time until that light-off temperature is reached can be shortened, for example, by the use of an electrically heatable catalytic converter. However, the increasingly stringent emission restrictions only require very low emissions of hydrocarbons to take place even immediately after a cold start. In order to achieve that, it is suitable to use an adsorber which is responsible for storing hydrocarbon molecules that are produced during the cold start.

Adsorbers having zeolite as a molecular sieve are known. Zeolites are microporous aluminosilicates (aluminum/silicon crystals) with the property of being able to take up certain molecules. The zeolite structure includes a tetrahedral framework with channels and/or cavities, the geometry of which characterizes a zeolite. During the cold-start phase of driving, the hydrocarbons are taken up in the porous structure of the adsorber (adsorption phase). The strength of bonding of the hydrocarbons to the adsorber is dependent on the type of hydrocarbons and the structure of the storage medium. The hydrocarbons stored in the adsorber are desorbed (desorption phase) as the operating time increases and the exhaust-gas temperature rises. That takes place at a temperature of between 100 and 200° C.

It is also known for an adsorber to be disposed in an exhaust system, in which a catalytic converter is disposed downstream of the adsorber. The adsorber constitutes a thermal mass which extracts heat from the exhaust gas. Consequently, when the exhaust gas flows through the downstream catalytic converter, it has a lower thermal energy, thus slowing the heating of the catalytic converter and therefore also delaying the point at which the light-off temperature is reached.

SUMMARY OF THE INVENTION

It is accordingly an object of the invention to provide a device for adsorbing at least one component of an exhaust gas, which overcomes the hereinafore-mentioned disadvantages of the heretofore-known devices of this general type and which significantly reduces hydrocarbon emissions in a cold-start phase and has only a very slight effect on heating of a downstream catalytic converter.

With the foregoing and other objects in view there is provided, in accordance with the invention, a device for adsorbing at least one component of an exhaust gas, comprising an adsorber having a volume through which an exhaust gas can flow at a temperature and mass flow rate. The volume corresponds to the following equation:

$$V \le a + b \cdot t + \frac{c}{m} + d \cdot t^2 + \frac{e}{m^2} + \frac{f \cdot t}{m} + g \cdot t^3 + \frac{h}{m^3} + \frac{i \cdot t}{m^2} + \frac{k \cdot t^2}{m}.$$

where:
V=Volume of the adsorber [l],
t=mean temperature of the exhaust gas [°C.],
m=mean mass flow rate of the exhaust gas [kg/h],
a=0.1660393, b=0.0033635701,
c=−1.7023186, d=6.5277225·10⁻⁶,
e=195.657, f=−0.1373556,
g=−9.0343024·10⁻⁹, h=−1273.9098,
i=1.0172767, and k=−1.442512·10⁻⁵.

The device according to the invention for adsorbing at least one component of an exhaust gas therefore has an adsorber through which an exhaust gas can flow. This device is particularly suitable for an exhaust system of an internal-combustion engine of a vehicle. The adsorber can be described on the basis of its volume, with this term being understood to mean the volume of the adsorber including the cavities and/or channels.

According to the invention, it is proposed for the volume of the adsorber to be determined as a function of the mean temperature and the mean mass flow rate of the exhaust gas flowing through it.

The equation given above is the result of extensive research into the adsorption performance of various adsorbers. During this research, crude emissions (the exhaust gas) from various internal-combustion engines which these engines would produce in the first 100 seconds of the US-FTP 75 driving cycle were simulated. In the course of this research, it was established that the adsorption and desorption performance of the adsorber is substantially dependent on the temperature and the mass flow rate of the exhaust gas.

The temperature of the exhaust gas generally decreases at increasing distance from the internal-combustion engine, since it is predominantly guided in a cooler system of pipes and thus releases heat. However, a pipe system of this type may have components for the catalytic conversion of pollutants. The catalytic reaction proceeds as an exothermic reaction, so that the temperature of the exhaust gas downstream of a catalytic converter may be higher than upstream of that converter. During the course of the research, different temperature profiles of the exhaust gas upstream of the adsorber were averaged over the first 100 seconds of the FTP test ([t]=°C.; degrees Celsius).

A further important characteristic variable when determining the appropriate volume for the adsorber is the mass flow rate of exhaust gas flowing through the adsorber ([m]=kg/h; kilograms per hour). The mass flow rate, for example, characterizes the heating or cooling action of the exhaust gas or the amount or concentration of the pollutants. The size and composition of the mass flow rate itself may, for example, be influenced by using an engine management system (e.g. through the use of the ignition angle or the idle speed of the engine) or a secondary air feed. The mass flow rate which is required, in particular in an idling phase, is also dependent on the structural configuration of the engine since, for example, different losses due to friction in the engine (for example at the valves, pistons or bearings) may be caused by the structural configuration. With the aid of the mass flow of the exhaust gas, these various factors can easily be taken into account when planing the adsorber volume. The mean mass flow rate also relates to the emission performance of an internal-combustion engine during the first 100 seconds of the FTP test.

Surprisingly, the results of this research have shown that, contrary to general opinion, an adsorber with a relatively small volume is sufficient. This is attributable, inter alia, to the fact that, during the determination of the formula of the invention for determination of the adsorber volume, not only the storage capacity but also the thermal mass of the adsorber and therefore the heat-up performance of a downstream catalytic converter were taken into account. A reduced volume represents a smaller thermal mass, so that less heat is extracted from the exhaust gas.

In accordance with another feature of the invention, the adsorber has a coating with a zeolite structure. The coating is made, in particular, with aluminosilicates (aluminum/silicon crystals). The geometric properties of the zeolite structure can easily be adapted to the size and nature of the hydrocarbon molecules. The zeolite structure has the advantage of making a large number of channels and/or cavities available, thus effecting relatively strong bonding of the hydrocarbon molecules which are to be stored.

In accordance with a further feature of the invention, the adsorber has sheet-metal layers, which are at least partially structured in such a way that an exhaust gas can flow through them. An adsorber with sheet-metal layers has the advantage of having a larger surface area and a lower pressure loss for the same volume compared, for example, to an adsorber made from ceramic.

In accordance with an added feature of the invention, the sheet-metal layers are constructed with metal sheets which have a thickness of from 0.02 mm to 0.08 mm. These relatively thin metal sheets ensure a low heat capacity of the adsorber and in this way do not reduce the thermal energy withdrawn from the exhaust gas.

In accordance with a concomitant feature of the invention, the adsorber has channels through which the exhaust gas can flow in a direction of flow, and a number of channels for a cross-sectional area transversely to the direction of flow is at least 600 cpsi (cells per square inch). A high number of channels provides a large surface area, with the result that, for example with a zeolite coating, a high storage capacity of the adsorber is ensured.

Other features which are considered as characteristic for the invention are set forth in the appended claims.

Although the invention is illustrated and described herein as embodied in a device for adsorbing at least one component of an exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
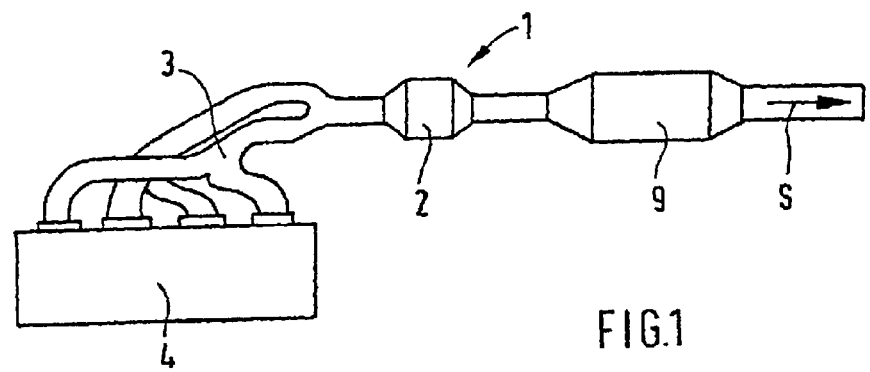
FIG. 1 is a diagrammatic, elevational view of a device for adsorbing at least one component of an exhaust gas with an adsorber used in an exhaust gas system of an internal combustion engine of a motor vehicle according to the invention.

Referring now to the figures of the drawings in detail and first, particularly, to FIG. 1 thereof, there is seen a device 1 for adsorbing at least one component of an exhaust gas with an adsorber 2 which is used in an exhaust gas system 3 of an internal combustion engine 4 of a non-illustrated motor vehicle according to the invention. A catalytic converter 9 is connected downstream of the adsorber 2, in an exhaust gas flow direction S which is indicated by an arrow.

Figure 2:
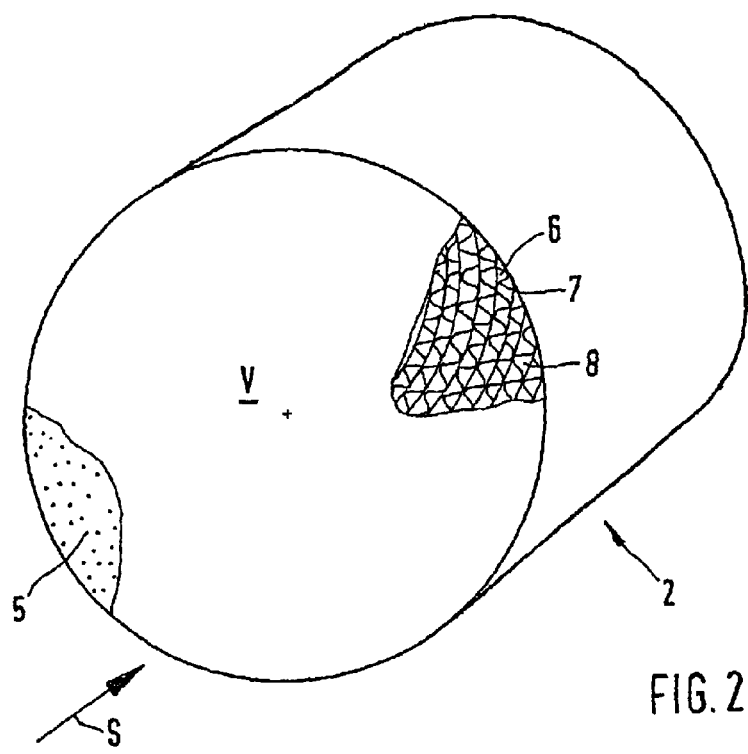
FIG. 2 is a greatly enlarged, partly broken-away, perspective view of the adsorber according to FIG. 1.

FIG. 2 shows the adsorber 2 according to FIG. 1 in a greatly enlarged perspective view. The adsorber 2 can be described by its volume V. The volume can be defined by a coating 5 with a zeolite structure and/or by at least partially structured sheet metal layers 6, 7, for example smooth sheet metal layers 6 and corrugated sheet metal layers 7, that form channels 8 through which the exhaust gas can flow.

The adsorber 2 with its volume V according to the invention is constructed in a particularly compact or solid manner in dependence on characteristics of the exhaust gas flowing therethrough. The adsorber 2 in particular improves the cold-start behavior of the catalytic converter 9 which is disposed downstream.

We claim:

1. In an motor vehicle exhaust gas system, a device for adsorbing at least one component of an exhaust gas, comprising:

an adsorber having a volume through which an exhaust gas can flow at a temperature and mass flow rate; said volume corresponding to the following equation:

$$V \leq a + b \cdot t + \frac{c}{m} + d \cdot t^2 + \frac{e}{m^2} + \frac{f \cdot t}{m} + g \cdot t^3 + \frac{h}{m^3} + \frac{i \cdot t}{m^2} + \frac{k \cdot t^2}{m},$$

where:
- V=Volume of the adsorber,
- t=mean temperature of the exhaust gas,
- m=mean mass flow rate of the exhaust gas,
- a=0.1660393,
- b=0.0033635701,
- c=−1.7023186,
- d=6.5277225·10$^{-6}$,
- e=195.657,
- f=−0.1373556,
- g=−9.0343024·10$^{-9}$,
- h=−1273.9098,
- i=1.0172767, and
- k=−1.442512·10$^{-5}$.

2. The device according to claim 1, wherein said adsorber has a coating with a zeolite structure.

3. The device according to claim 1, wherein said adsorber has sheet-metal layers being at least partially structured to permit the exhaust gas to flow through said sheet-metal layers.

4. The device according to claim 3, wherein said sheet-metal layers are constructed with metal sheets having a thickness of 0.02 mm to 0.08 mm.

5. The device according to claim 1, wherein said adsorber has channels through which the exhaust gas can flow in a direction of flow, and a number of said channels per unit of cross-sectional area transversely to said direction of flow is at least 600 cpsi.

* * * * *